No. 895,660. PATENTED AUG. 11, 1908.
W. MORRISON.
ELECTRIC BATTERY.
APPLICATION FILED AUG. 11, 1902.

2 SHEETS—SHEET 1.

Witnesses
J B Weir
Harry R. Baumgartner

Inventor:—
William Morrison
By Chas. C. Buckley
Atty

No. 895,660. PATENTED AUG. 11, 1908.
W. MORRISON.
ELECTRIC BATTERY.
APPLICATION FILED AUG. 11, 1902.
2 SHEETS—SHEET 2.
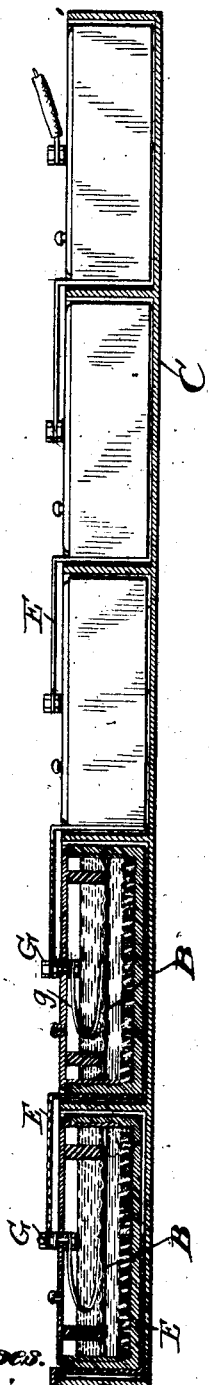
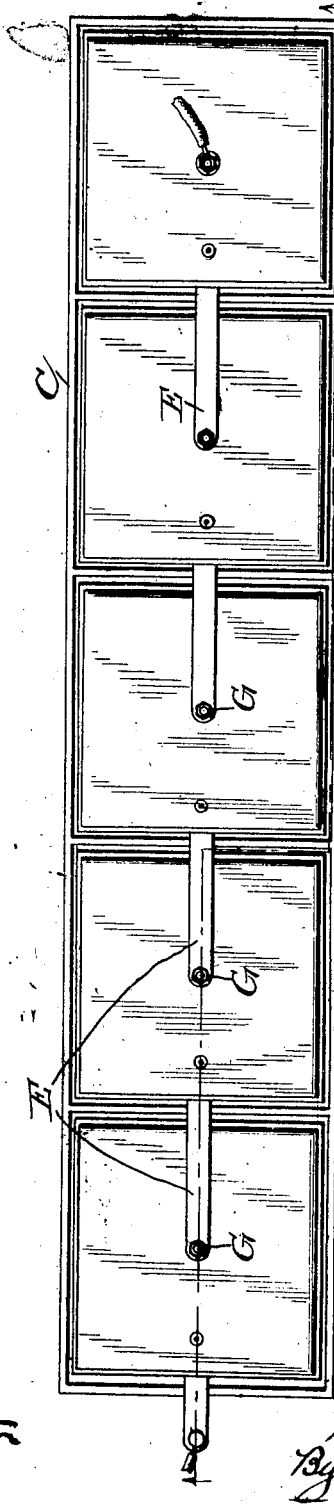

UNITED STATES PATENT OFFICE.

WILLIAM MORRISON, OF CHICAGO, ILLINOIS, ASSIGNOR TO GEORGE RUMRILL CORYELL, OF CHICAGO, ILLINOIS.

ELECTRIC BATTERY.

No. 895,660.  Specification of Letters Patent.  Patented Aug. 11, 1908.

Application filed August 11, 1902. Serial No. 119,202.

*To all whom it may concern:*

Be it known that I, WILLIAM MORRISON, a citizen of the United States of America, and resident of Chicago, Cook county, Illinois, have invented a certain new and useful Improvement in Electric Batteries, of which the following is a specification.

My present invention relates to an improved containing cell for an electric battery in which bromin is used. It is necessary to provide a containing cell of such a character of material as will resist the attacks of the bromin and also it is desirable to provide a cell the bottom of which also constitutes the negative element.

In carrying out my invention I provide a containing cell of carbon, and this material not only is capable of resisting the attacks of the bromin but it also provides a material suitable for the negative element of the battery.

I have described and claimed in another application of even date herewith, No. 119,205, and hereinafter referred to, a bromin gravity cell in which the bromin is deposited or placed upon the bottom of the cell. It is more particularly to such a battery that my present invention is adapted. In that application I have stated that the bromin is deposited or placed upon the bottom of the cell and have defined what is meant by this expression. In this application I shall show, describe, and claim an electric battery using bromin in which the bottom of the cell is the negative element itself.

Figure 1:
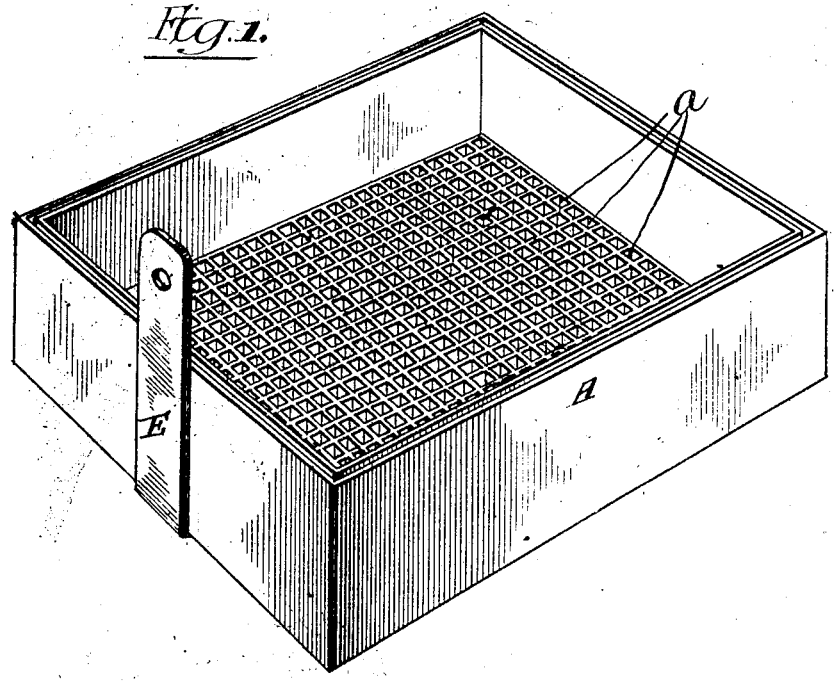
Figure 2:
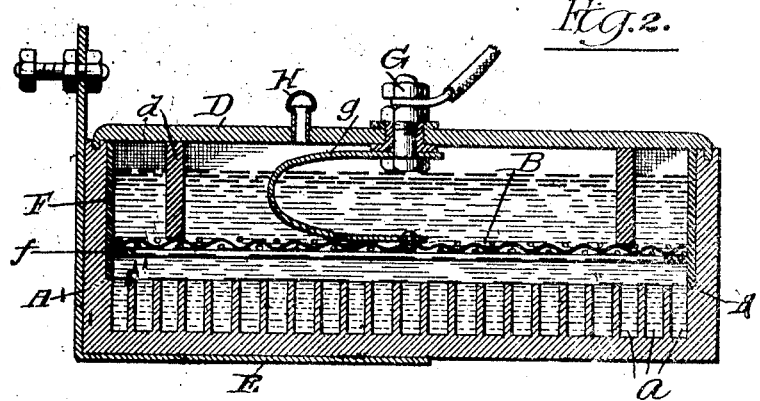
Figure 3:
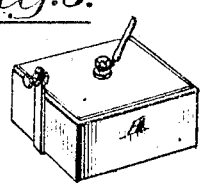

Reference may now be had to the accompanying drawings in which: Figure 1, is a perspective view of a containing cell with all of the parts removed from its interior and showing the bottom of the cell as the negative element. Fig. 2, is a cross section on the line *x—x* of Fig. 1. Fig. 3 is a perspective of the completed battery. Fig. 4 shows a number of the batteries connected and arranged in a tray. Fig. 5 is a plan of the arrangement shown in Fig. 4.

In an application for patent filed concurrently herewith No. 119,205, I have described and claimed, as generally stated, a gravity bromin cell and I will not here repeat the description.

It is well known that bromin attacks and destroys nearly all of the metals, and it is necessary to provide a material for the cell which will withstand such attacks. I have found that carbon is an excellent material for the purpose on account of its cheapness and because it is but little affected by the bromin. Carbon is also an excellent material for the negative element and by making the whole cell of carbon a bottom A for said cell is provided. In this bottom A, which is the negative element the pockets *a* are formed, the purpose of which I have set forth in said application to be to maintain the liquid bromin more stable in the bodily movements of the cell.

Above the negative element A is the positive element B of copper wire gauze or other suitable material. The bromin is placed upon, or electro deposited upon the carbon bottom A of the carbon cell, and when so placed is upon the negative element and within the pockets.

It is desirable that the carbon should be as pure as possible and of great density. The cells may be treated with a suitable material to render them impervious to liquids, and they may then be placed in a suitable tray C and cemented therein by a suitable substance which will not be attacked by the bromin. The carbon cell and a suitable soft substance which is not attacked by the bromin may be used and the connections made as shown in Figs. 4 and 5.

It is known that bromin will attack and destroy many materials and many materials which it does not materially affect are destroyed by the bromin under the electrical charge but even under the charge the bromin affects the carbon but little.

As carbon is a conductor it is evident that metallic connections may be established upon the exterior of the cell. As shown, the battery may have a cover or lid D adapted to rest upon the space or distance pieces *d*, which latter in turn rest upon the positive element. An insulating frame F is fitted within the cell, and is provided with a ledge *f* which supports the positive element. The cell or negative element is provided with a terminal E. The positive element is connected with a binding-post G through the medium of a conductor *g*. A vent H of any suitable known or approved character can also be provided.

The serial numbers of my co-pending applications are as follows: 119,201, 119,203, 119,204, and 119,205.

It will be understood that the positive element B can be made of any suitable material.

What I claim as my invention is:

1. In an electric battery in which bromin is utilized, a cell having a carbon bottom serving as the negative element the battery being so constructed that the deposit of bromin is held by gravity upon the upper surface of the bottom of the cell, said upper surface being the negative element.

2. In an electric battery in which bromin is utilized, a carbon cell the battery being so constructed that the deposit of bromin is held by gravity upon the upper surface of the bottom of the cell, said upper surface being the negative element.

3. A bromin storage battery having a cell constituting the negative element the battery being so constructed that the deposit of bromin is held by gravity upon the upper surface of the bottom of the cell, said upper surface being the negative element.

Signed by me at Chicago, Cook county, Illinois, this 8th day of August 1902.

WILLIAM MORRISON.

Witnesses:
CHAS. C. BULKLEY,
HARRY P. BAUMGARTNER.